(12) United States Patent
Ahmed et al.

(10) Patent No.: US 12,450,328 B2
(45) Date of Patent: Oct. 21, 2025

(54) SPDM-ENABLED DEVICE WARRANTY MANAGEMENT SYSTEM AND METHOD

(71) Applicant: Dell Products, L.P., Round Rock, TX (US)

(72) Inventors: A Anis Ahmed, Bangalore (IN); Mini Thottunkal Thankappan, Bangalore (IN); Dharma Bhushan Ramaiah, Bangalore (IN); Vineeth Radhakrishnan, Palakkad (IN)

(73) Assignee: Dell Products, L.P., Round Rock, TX (US)

( * ) Notice: Subject to any disclaimer, the term of this patent is extended or adjusted under 35 U.S.C. 154(b) by 258 days.

(21) Appl. No.: 18/174,188

(22) Filed: Feb. 24, 2023

(65) Prior Publication Data

US 2024/0289429 A1    Aug. 29, 2024

(51) Int. Cl.
*H04L 9/32*    (2006.01)
*G06F 21/44*    (2013.01)
*H04L 9/08*    (2006.01)

(52) U.S. Cl.
CPC .................................. *G06F 21/44* (2013.01)

(58) Field of Classification Search
CPC .............................. G06F 21/30; G06F 21/44
USPC ...................................................... 726/17–18
See application file for complete search history.

(56) References Cited

U.S. PATENT DOCUMENTS

| | | | | |
|---|---|---|---|---|
| 8,640,200 | B1* | 1/2014 | Roth | G06F 21/10 726/18 |
| 2012/0054841 | A1* | 3/2012 | Schultz | G06F 21/44 726/22 |
| 2020/0021447 | A1* | 1/2020 | Ih | H04L 9/3073 |
| 2022/0109672 | A1* | 4/2022 | Manjunatha | G06F 21/44 |
| 2023/0239165 | A1* | 7/2023 | Young | H04L 9/3265 713/175 |
| 2023/0306141 | A1* | 9/2023 | Ramaiah | G06F 21/73 |
| 2023/0351056 | A1* | 11/2023 | Marando | G06F 21/72 |
| 2024/0291636 | A1* | 8/2024 | Rahiman | H04L 9/3263 |

* cited by examiner

*Primary Examiner* — Bharat Barot
(74) *Attorney, Agent, or Firm* — Fogarty LLP

(57) ABSTRACT

According to embodiments of the present disclosure, a Security Protocol and Data Model (SPDM)-enabled device uses a device identity to provide, among other things, storing of warranty information, and a technique to uniquely identify the SPDM-enabled device so that its movement can be tracked. An Information Handling System (IHS) includes a processor and a memory coupled to the processor, the memory having program instructions that, upon execution, cause the IHS to obtain context information associated with the SPDM-enabled device conforming to a SPDM specification, generate an identity certificate including the context information, and store the certificate in a slot of the SPDM-enabled device.

20 Claims, 4 Drawing Sheets

SPDM-ENABLED DEVICE WARRANTY MANAGEMENT SYSTEM AND METHOD

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In modern day IHSs, administrative management is often provided via baseboard management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take some corrective actions, such as resetting or power cycling the system to get a hung O/S running again. These abilities save on the total cost of ownership of an IHS, particularly when implemented in large clusters, such as server farms.

SUMMARY

According to embodiments of the present disclosure, a Security Protocol and Data Model (SPDM)-enabled device uses a device identity to provide, among other things, storing of warranty information, and a technique to uniquely identify the SPDM-enabled device so that its movement can be tracked. An Information Handling System (IHS) includes a processor and a memory coupled to the processor, the memory having program instructions that, upon execution, cause the IHS to obtain context information associated with the SPDM-enabled device conforming to a SPDM specification, generate an identity certificate including the context information, and store the certificate in a slot of the SPDM-enabled device.

According to another embodiment, a method includes the steps of obtaining context information associated with a Security Protocol and Data Model (SPDM)-enabled device configured in an Information Handling System (IHS), generating an identity certificate including the context information, and storing the certificate in a slot of the SPDM-enabled device.

According to yet another embodiment, a Baseboard Management Controller (BMC) includes computer-executable code that when executed, causes the BMC to obtain context information associated with a Security Protocol and Data Model (SPDM)-enabled device, generate an identity certificate including the context information, and store the certificate in a slot of the SPDM-enabled device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
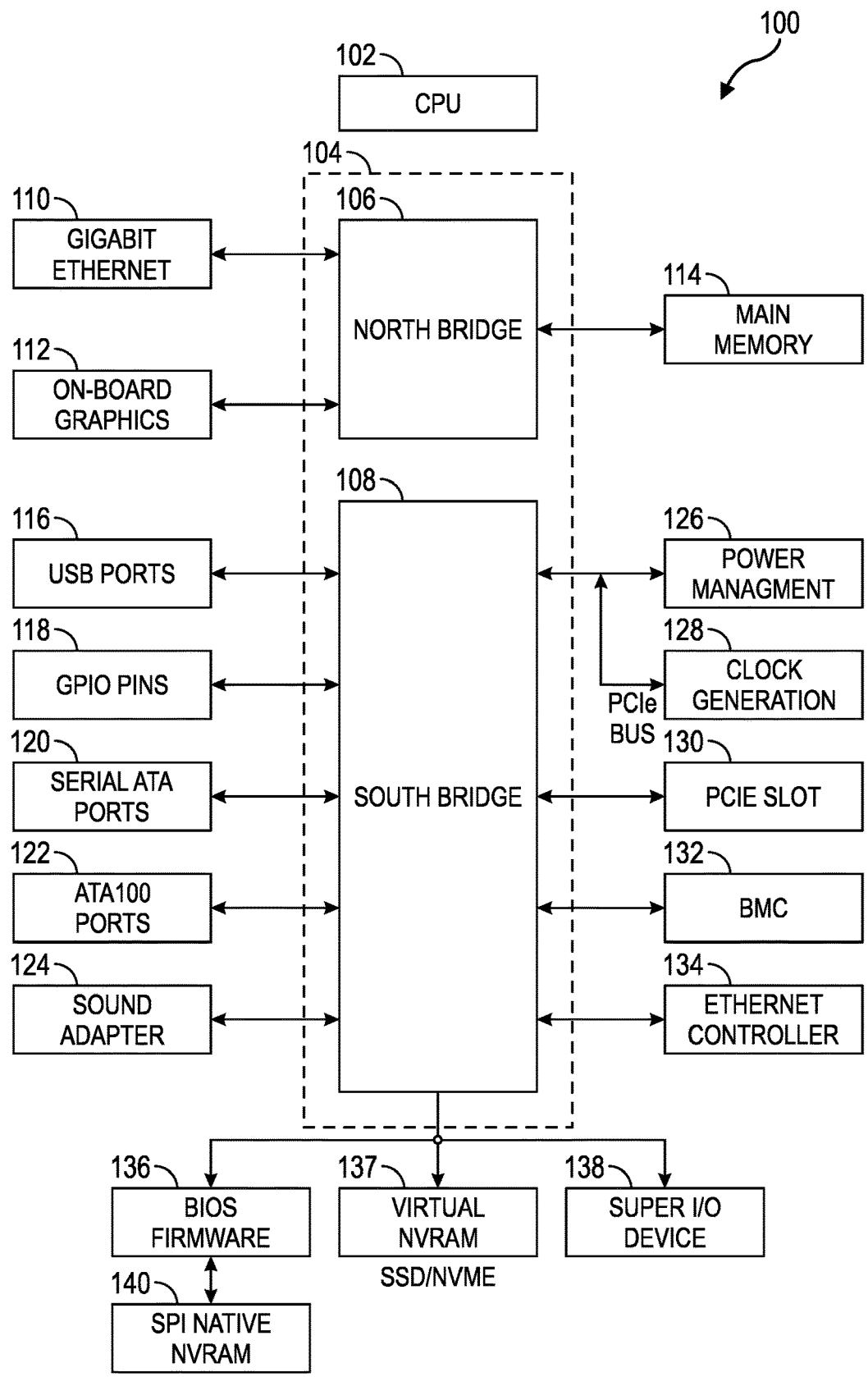
FIG. 1 shows an example of an Information Handling System (IHS) that may be configured to implement the context information management system and method described herein.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which support peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

Newer IHS platforms that are configured with multiple compute nodes and redundant BMCs, which offer High Availability (HA) is gaining in market popularity. That is, a typical server may be configured with multiple, redundant BMCs to increase its effective HA. Although these platforms offer HA for customers to manage the servers, this presents a unique challenge in handling shared resources such as an NVMe SSDs. Currently, up to twenty-four (24) NVMe SSDs may be allocated to a single server, and this number is expected to further increase in the future. The PCIe VDM communication requirements, nevertheless, may incur an impact on the input/output (I/O) bandwidth of the devices. The impact on IO bandwidth of a device is aggravated when two or more BMCs communicating to the same device and issuing same commands. For example, the maximum throughput of a ×4 PCIe 3.0 Card, which can be 4 GB/s per direction may incur a loading of approximately 1.25 percent (%). As additional examples, the maximum throughput of a ×8 PCIe 3.0 Card, which can be 8 GB/s per direction may incur a loading of approximately 0.625%, while that of a ×16 PCIe 3.0 Card, which can be 16 GB/s per direction may incur a loading of approximately 0.3125 percent (%).

As will be described in detail herein below, SPDM-enabled devices with the device identity (e.g., slot 0) provides a technique to uniquely identify the device/BMC combination so that their movement can be tracked. That is, a slot (e.g., either of slots 1-7) may store a certificate including context information associated with a log of a historical location of the SPDM-enabled device over its serviceable life. Individual components can be identified in cases of fraud, theft, or damage and this history can be documented regardless of the system they originally shipped with or which they are current installed. The history of movement (e.g., repurpose, refurbish, etc.) is traceable via the identity certificate. The chain of custody management system may also facilitate forensic investigations via the chain of custody. Additionally, warranty information may be available in repurposing situations across the device's lifecycle.

FIG. 1 shows an example of an IHS configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. Managed devices may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

IHSs are typically sold with a warranty that provides for repair or replacement of the system if a component of the system fails during an initial warranty period. A particular model computer system may be sold in many different configurations. For example, the processor will be available in several different clock frequencies, memory is available in many different increments, the size of disk storage will vary, and different video and audio controllers may be employed. In other words, different IHSs will have different configurations due to the relatively large variation in configuration options for IHSs.

Conventional warranty systems typically generate and manage standard warranties for IHSs, such as servers, home computers, and the like. A standard warranty includes a typical service coverage that is offered to customers by a vendor, such as a manufacturer, seller, re-seller, or subcontracted service agent, upon purchase of the individual device, such as a typical server warranty. In some cases, the vendor may offer an extended warranty if that option is available. The vendor may support many types of warranties, which can make it difficult for a customer representative to select the correct warranty type applicable for the customer product. For larger customer accounts, the vendor may allocate a dedicated Technical Account Manager (TAM), who can analyze the customer requirements and help the customers with required warranty types. Unfortunately, customers may experience extended system downtime or degraded functionality when a non-optimal warranty has been purchased for the device. There are multiple reasons that contribute to the selection of a non-optimal warranty, such as limited understanding of cost or available warranty offerings, or changes in device usage or intent after purchase.

Warranties typically have common features, such as a warranty type that identifies the covered component types (e.g., software and/or hardware), a warranty replacement SLA that identifies the level of services expected by the customer from the vendor (e.g., next business day (NBD), second business day (SBD), four hours (4 H), eight hours (8 H), mission critical (MC), etc.), and a support type that identifies the types of support provided (e.g., engineer/technician level one (L1), level two (L2), or level three (L3), Post Support, etc.) or other support based on standard naming conventions.

The warranty may also identify a warranty start date and a warranty end date. The warranty SLA can have a significant impact on the customer's operations. For example, a server with a SBD warranty may experience downtime up to two days, which could have been reduced to four hours if a 4 H response warranty was in place.

Gaps in warranty offers can exist. For example, while some of warranty offers may have three warranty types (e.g., L1, L1+L2, L1+L2+L3), in other warranties only L1 or L1+L2 might be offered. Moreover, in some cases a warranty offers coverage for products such as system management software; however, other warranty offers may not provide such coverage. At times, there may be a high volume of requests for support or part replacement that is not usually covered by warranty offers. If the volume of such requests increases, then the vendor may need to offer warranties with appropriate coverage, which would increase warranty revenue and increase customer confidence.

As the inventors hereof have determined, a warranty typically attaches to the system in the condition it leaves the factory, systems integrator or Value Added Reseller (VAR). If a user makes changes to the configuration after sale, it is possible that the initial warranty may be void or will not cover the new configuration. Moreover, as also recognized by the inventors, IHS customers often do make changes to the system configuration after sale. For example, a larger hard disk drive or a video card may be added by the user to increase the IHS's performance. This presents a problem when the user approaches the seller asking for an upgraded warranty that covers the new configuration. Questions may also arise with respect to what the price of the upgraded warranty should be. A "one size fits all" upgraded warranty price where a single warranty price is quoted that is the same for all configurations of a particular model computer system even though the configurations often vary (e.g., the warranty price is based on the average of expected warranty costs spread across the many different configurations of a particular model) would be undesirable. For example, an IHS 100 gets shipped to a VAR, the end user (e.g., customer) then takes possession and initiates its associated warranty period via a third party service provider. The warranty information, however, of various managed devices may not be available directly from the BMC 132. Thus, lifecycle management of those managed devices cannot be monitored by the BMC 132.

Figure 2:
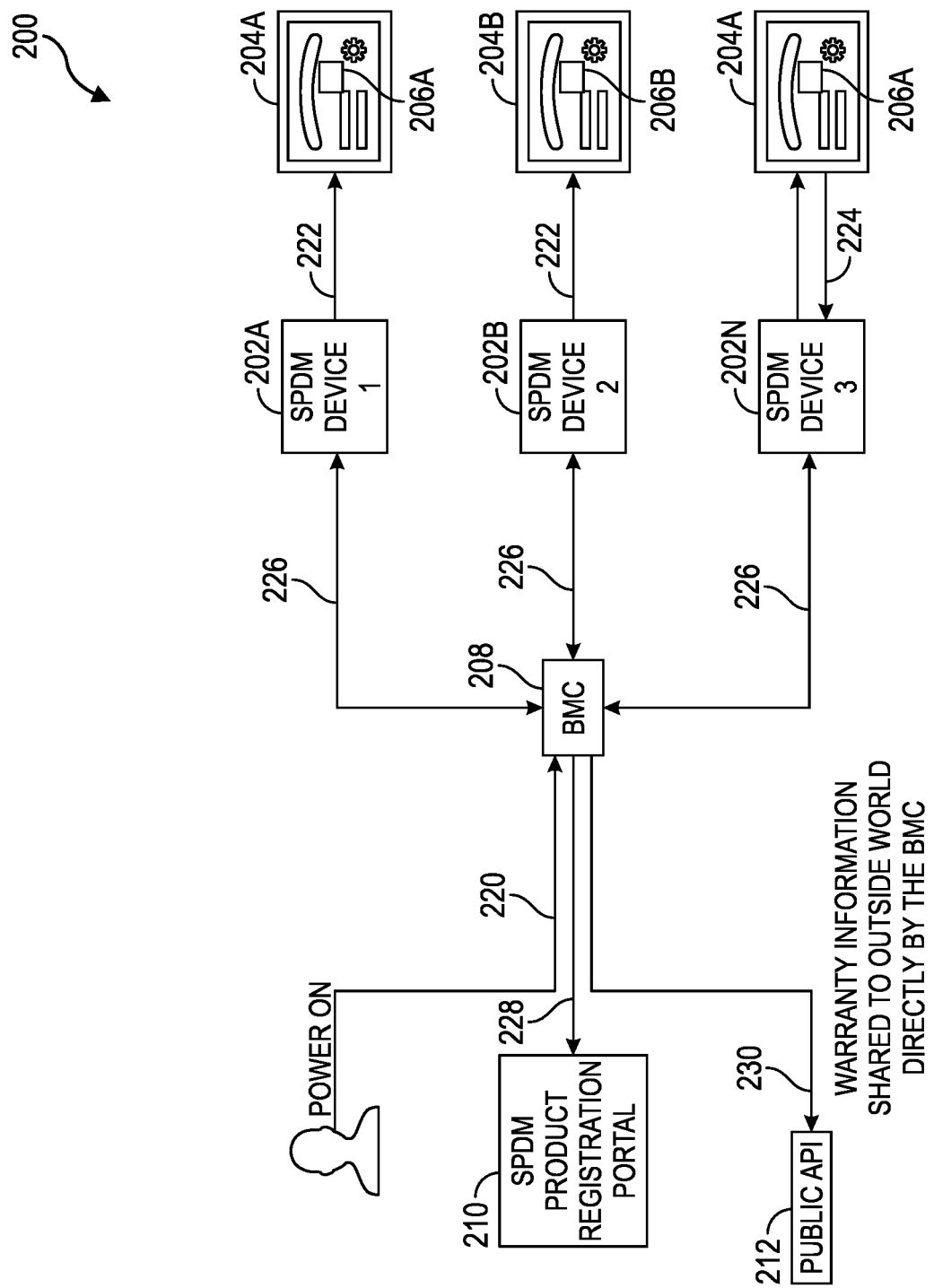
FIG. 2 illustrates an example SPDM-enabled device warranty management system according to one embodiment of the present disclosure.

FIG. 2 illustrates an example SPDM-enabled device warranty management system 200 according to one embodiment of the present disclosure. The SPDM-enabled device warranty management system 200 includes an IHS 100 configured with a BMC 132 and one or more SPDM-enabled devices 202a-n. Each SPDM-enabled device 202a-n stores a certificate 204a-n, such as one slot (e.g., slot 0-7) used to mutually authenticate with the BMC 132 according to the SPDM specification. Each certificate 204a-n in turn, stores warranty information 206a-n that stays with its associated SPDM-enabled device 202a-n such that even if the SPDM-enabled device 202a-n is removed from the IHS 100 and inserted into another IHS, warranty information 206a-n is readily available. In one embodiment, a copy 208 of the warranty information 206a-n may also be stored in the BMC 132. For example, the BMC 132 may retrieve and store the copy of warranty information 208 when it authenticates each of the SPDM-enabled devices 202a-n. Essentially, each SPDM-enabled device 202a-n would add a warranty field in its certificate 204a-n. On first powerup, the BMC 132 may communicate with the SPDM-enabled devices 202a-n, and fetch the warranty information 206a-n of the device such that it may be used to manage the warranty of each device 202a-n.

To illustrate an example SPDM-enabled device warranty management method, when the IHS 100 is powered on (e.g., for the first time) at step 220, the BMC 132 may in response, authenticate each of the SPDM-enabled devices 202a-n by accessing each certificate 204a-n at step 222. As the certificate 204a-n is accessed, the BMC 132 may retrieve the warranty information 206a-n at step 224. Optionally at step 226, the BMC 132 may store a copy 208 of the warranty information 206a-n.

In one embodiment, the BMC 132 may communicate with an online SPDM product registration portal 210 at step 228 to determine whether the SPDM-enabled device 202a-n has been registered for use, and if not, communicate with the SPDM product registration portal 210 to register the SPDM-enabled device 202a-n. In another embodiment, the BMC 132 at step 230 may share the warranty information 206a-n with a suitable public API 212. For example, a user, vendor, and/or other interested party (e.g., VAR) of the IHS 100 may access the BMC 132 to obtain warranty information, such as what SPDM-enabled devices 202a-n are currently under warranty, the expiration date of those warranties, and the level of services provided under those warranties.

Figure 3:
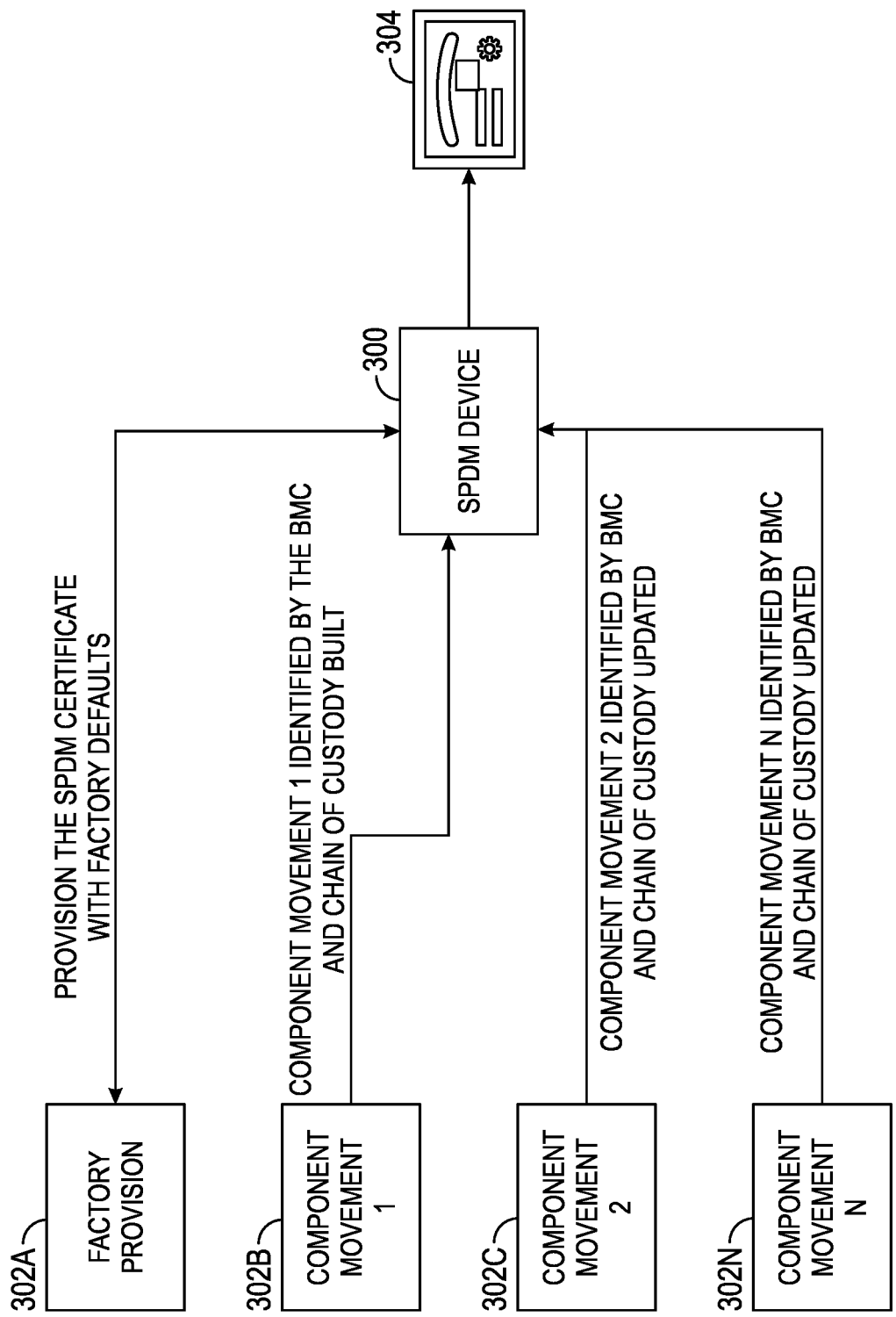
FIG. 3 illustrates a diagram view showing a chain of custody management system according to one embodiment of the present disclosure.

FIG. 3 illustrates an example chain of custody progression that may be performed by the chain of custody management system according to one embodiment of the present disclosure. The chain of custody progression generally includes a SPDM-enabled device 300 and its associated movement state 302a-d over time. In a data center, it is a common practice to move SPDM-enabled devices 202a-n from one IHS 100 (e.g., server) to another. Conventionally, if one were to audit the device movement, it would have required to be conducted manually. Users (e.g., customers, OEMs, and VARs, etc.) have not had a method to identify the history of an individual component to determine if the component originally shipped is a new one or a used one. For example, an OEM may unknowingly replace EOL components which have been swapped into Non-EOL systems without a reliable method to track individual components. Additionally, in a remote data center, it may not be possible to get the real time audit status of the devices configured in the data center.

The SPDM-enabled device 300 stores a chain of custody certificate 304 on a slot other than slot 0 of the SPDM data structure. The chain of custody certificate 304 is generated by the device 300 during run time and is signed using the private key of the SPDM-enabled device identity certificate (e.g., slot 0). The initial provisioning of the SPDM-enabled device 300 may also be performed using this technique. Information regarding usage of the certificates in the other slots can be made available to the BMC either by using an OEM command or an extension to the GetCertificates command as specified by SPDM.

Given the example movement sequence as shown, the SPDM-enabled device 300 at an original movement state 302a is originally provisioned with a first BMC during manufacture, and after some point in time is moved (e.g., refurbished, repurposed, etc.) from one BMC to another BMC (e.g., in another IHS 100) at a second movement state 302b. At this point, the BMC 132 in the other IHS 100 may build a chain of custody certificate 304, which is stored in a SPDM slot other than slot 0 (e.g., slots 1-7). After another point in time, the SPDM-enabled device 300 is again moved to yet another BMC in another IHS 100 at movement state 302c. At this point, the BMC 132 in the other IHS 100 may update the chain of custody certificate 304, and store it in the selected slot. After yet another point in time, the device 300 is again moved to yet another BMC in another IHS 100 at movement state 302d. At this point, the BMC 132 in the other IHS 100 may update the chain of custody certificate 304, and store it in the selected slot. Thus as can be seen the chain of custody certificate 304 provides a technique to continually track the history of the SPDM-enabled device 300 throughout its lifecycle.

Figure 4:
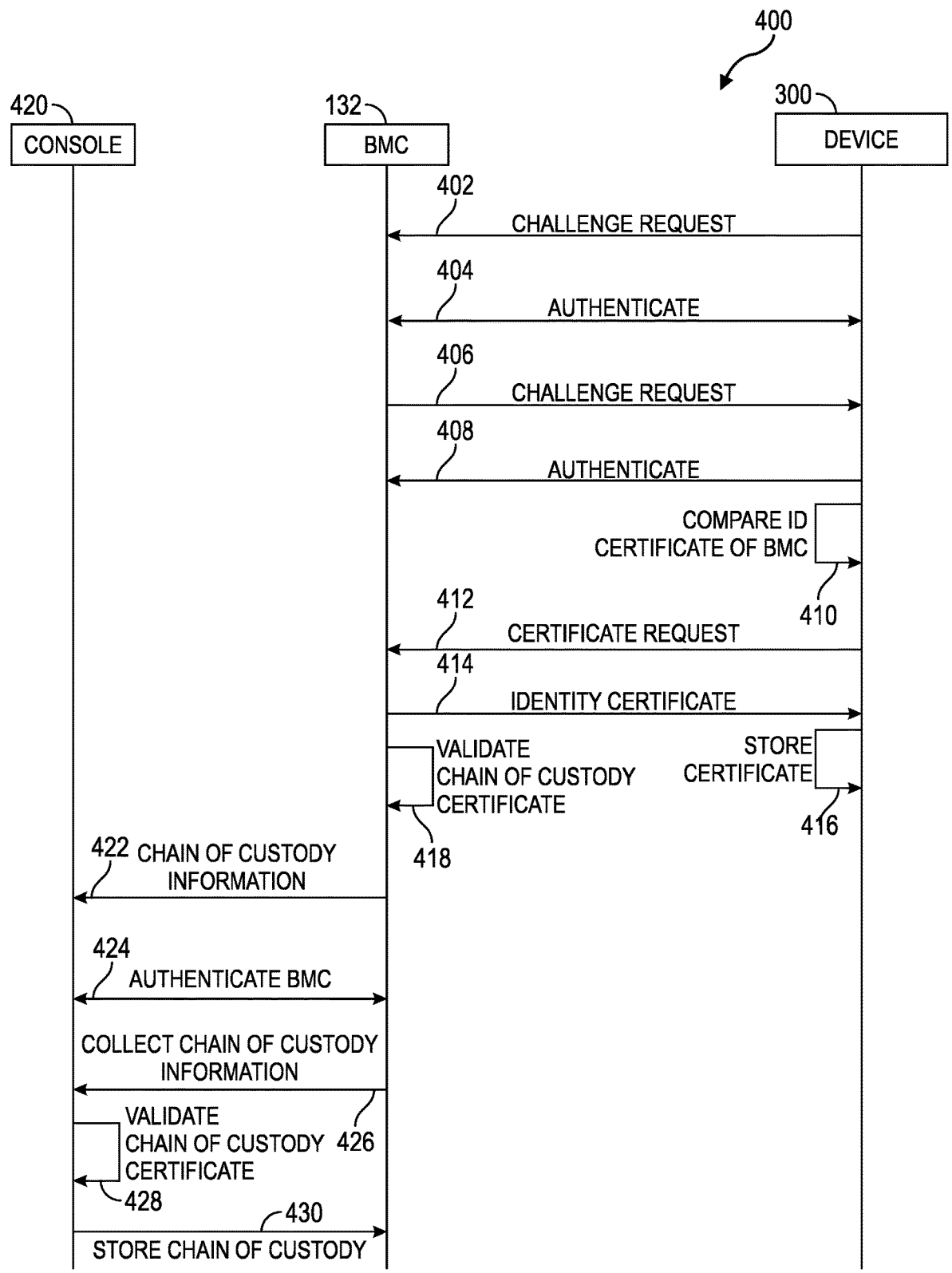
FIG. 4 illustrates an example chain of custody management method that may be performed to provide a chain of custody certificate that is updated each time the SPDM-enabled device is moved from one IHS to another according to one embodiment of the present disclosure.

FIG. 4 illustrates an example chain of custody management method 400 that may be performed to provide a chain of custody certificate 304 that is updated each time the SPDM-enabled device 300 is moved from one IHS 100 to another according to one embodiment of the present disclosure. For example, the method 400 may be performed each time the IHS 100 configured with the BMC 132 and SPDM-enabled device 300 is cold booted, warm booted, and/or with an on chip request (OCR).

At step 402, the SPDM-enabled device 300 authenticates the BMC 132 by issuing a challenge request, and at step 404, the BMC 132 authenticates itself with the SPDM-enabled device 300. At step 406, the BMC 132 authenticates the SPDM-enabled device 300 using a challenge request, and at step 408, the SPDM-enabled device 300 authenticates itself with the BMC 132.

During authentication of the BMC 132, the SPDM-enabled device 300 obtains the identity certificate of the BMC 132 and compares it with its stored version associated with the BMC 132 it was previously communicating with during a previous runtime session at step 410. This can be done by comparing the chain of custody certificate 304 of the device with identity provided by the BMC 132 during the challenge sequence. If a change is detected, the SPDM-enabled device 300 internally can request a certificate request (CSR) using a SPDM-enabled device identity certificate to extend the chain of custody certificate 304 at step 412. At step 414, the BMC 132 sends its identity certificate to the SPDM-enabled device 300. Once the certificate 304 is signed by the SPDM-enabled device identity certificate, the chain of custody certificate 304 may be stored within the designated slot at step 416. In one embodiment, the SPDM-enabled device 300 may optionally generate a SPDM event to inform the BMC 132 about the change in the certificate.

When the BMC 132 authenticates the SPDM-enabled device 300, it validates the chain of custody certificate 304 at step 418, and sends the chain of custody information obtained from the chain of custody certificate 304 to a console 420 at step 422. The console 420 may be any type that monitors and controls the operation of the IHS 100. For example, the console 420 may include at least a portion of the Dell EMC OpenManage Enterprise (OME) that is installed on a secure virtual machine (VM), such as a VMWARE Workstation. Thereafter at step 424, the console 420 authenticates the BMC 132 via a challenge sequence, and at step 426, collects the chain of custody information of the SPDM-enabled device 300 from the BMC 132.

At step 428, the console 420 iterates through the chain of information to see if the SPDM-enabled device 300 has been moved from a known BMC. If the device is not moved from a known BMC, the console 420 may generate an alert message that the SPDM-enabled device 300 has been moved. This event may be useful to identify whether the SPDM-enabled device 300 is either a new or a used device. The console 420 may then store the chain of custody certificate associated with the SPDM-enabled device 300 for future review, such as real time auditing.

Although FIG. 4 describes an example method 400 that may be performed to store chain of custody warranty information, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a Security Protocol and Data Model (SPDM)-enabled device conforming to a SPDM specification, wherein the SPDM-enabled device is configured with eight SPDM certificate slots numbered 0 to 7;
   a processor; and
   a memory coupled to the processor, the memory having program instructions stored thereon that, upon execution, cause the IHS to:
     obtain context information that comprises a historical location of the SPDM-enabled device;
     generate an identity certificate that comprises the context information; and
     store the certificate in an SPDM certificate slot other than slot 0 of the SPDM-enabled device.

2. The IHS of claim 1, wherein the program instructions, upon execution, further cause the IHS to, when the SPDM-enabled device is started for a first time, communicate with an online portal to register the SPDM-enabled device, wherein the context information comprises warranty information associated with the SPDM-enabled device.

3. The IHS of claim 2, wherein the program instructions, upon execution, further cause the IHS to lock the SPDM-enabled device from being used until the SPDM-enabled device has been registered with the online portal.

4. The IHS of claim 2, wherein the program instructions, upon execution, further cause the IHS to generate a publicly accessible Application Program Interface (API) to expose the warranty information.

5. The IHS of claim 1, wherein the program instructions, upon execution, further cause the IHS to store a copy of the context information in a memory of a Baseboard Management Controller (BMC), wherein the instructions are performed by the BMC.

6. The IHS of claim 1, wherein the program instructions, upon execution, further cause the IHS to store a copy of the context information for each of a plurality of the SPDM-enabled devices.

7. The IHS of claim 1, wherein the context information further comprises a log of the historical location of the SPDM-enabled device and identification of individual components associated with the SPDM-enabled device during a serviceable life of the SPDM-enabled device.

8. The IHS of claim 6, wherein the program instructions, upon execution, further cause the IHS to:
   determine whether the SPDM-enabled device is configured in an illicit location; and
   generate an alert message to an online console based upon the determination.

9. A method comprising:
   obtaining context information comprising a historical location of a Security Protocol and Data Model (SPDM)-enabled device configured in an Information Handling System (IHS), wherein the SPDM-enabled device conforms to a SPDM specification and is configured with eight SPDM certificate slots numbered 0 to 7;
   generating an identity certificate that comprises the context information; and
   storing the certificate in an SPDM certificate slot other than slot 0 of the SPDM-enabled device.

10. The method of claim 9, further comprising communicating with an online portal to register the SPDM-enabled device when the SPDM-enabled device is started for a first time, wherein the context information comprises warranty information associated with the SPDM-enabled device.

11. The method of claim 10, further comprising locking the SPDM-enabled device from being used until the SPDM-enabled device has been registered with the online portal.

12. The method of claim 10, further comprising generating a publicly accessible Application Program Interface (API) to expose the warranty information.

13. The method of claim 9, further comprising storing a copy of the context information in a memory of a Baseboard Management Controller (BMC).

14. The method of claim 9, further comprising:
   determining whether the SPDM-enabled device is configured in an illicit location by accessing the context information, wherein the context information comprises a log of a historical location of the SPDM-enabled device during a serviceable life of the SPDM-enabled device; and
   generating an alert message to an online console based upon the determination.

15. A Baseboard Management Controller (BMC) comprising:
   a processor; and
   a memory coupled to the processor, the memory having program instructions stored thereon that, upon execution, cause the BMC to:
     obtain context information that comprises a historical location of a Security Protocol and Data Model (SPDM)-enabled device, wherein the SPDM-enabled device conforms to a SPDM specification and is configured with eight SPDM certificate slots numbered 0 to 7;
     generate an identity certificate that comprises the context information; and
     store the certificate in an SPDM certificate slot other than slot 0 of the SPDM-enabled device.

16. The BMC of claim 15, wherein the program instructions, upon execution, further cause the BMC to:
   communicate with an online portal to register the SPDM-enabled device when the SPDM-enabled device is started for a first time, wherein the context information comprises warranty information associated with the SPDM-enabled device; and
   lock the SPDM-enabled device from being used until the SPDM-enabled device has been registered with the online portal.

17. The BMC of claim 16, wherein the program instructions, upon execution, further cause the BMC to generate a publicly accessible Application Program Interface (API) to expose the warranty information.

18. The BMC of claim 15, wherein the program instructions, upon execution, further cause the BMC to store a copy of the context information in a memory of a Baseboard Management Controller (BMC), wherein the instructions are performed by the BMC.

19. The BMC of claim 18, wherein the program instructions, upon execution, further cause the BMC to store the copy of the context information for each of a plurality of the SPDM-enabled devices.

20. The BMC of claim 15, wherein the context information comprises a log of a historical location of the SPDM-enabled device during a serviceable life of the SPDM-enabled device.

* * * * *